United States Patent [19]
Schwartz

[11] Patent Number: 5,644,509
[45] Date of Patent: Jul. 1, 1997

[54] METHOD AND APPARATUS FOR COMPUTING COLOR TRANSFORMATION TABLES

[75] Inventor: Michael Schwartz, Belmont, Mass.

[73] Assignee: Eastman Kodak Company, Rochester, N.Y.

[21] Appl. No.: 320,023

[22] Filed: Oct. 7, 1994

[51] Int. Cl.⁶ .................................................. G03F 3/00
[52] U.S. Cl. ................................. 364/526; 358/518
[58] Field of Search .................................. 364/526, 723, 364/731; 358/518, 519, 520, 521, 522, 523, 524, 525, 530, 539, 443, 448; 395/109, 127, 131; 348/403, 406, 405, 395, 400, 580, 582, 649; 345/153, 150, 152, 199, 202, 203, 149; 382/248, 280, 298, 299, 300

[56] References Cited

U.S. PATENT DOCUMENTS

| | | |
|---|---|---|
| 4,314,274 | 2/1982 | Atoji et al. . |
| 4,500,972 | 2/1985 | Kuhn et al. . |
| 4,929,978 | 5/1990 | Kanamori et al. . |
| 5,185,661 | 2/1993 | Ng .................................. 358/75 |
| 5,208,911 | 5/1993 | Newman et al. . |
| 5,231,504 | 7/1993 | Magee . |
| 5,278,678 | 1/1994 | Harrington . |

Primary Examiner—Emanuel T. Voeltz
Assistant Examiner—Tony M. Cole
Attorney, Agent, or Firm—Peyton C. Watkins

[57] ABSTRACT

A transform table creation system that provides nonuniform grid point spacing for input and output tables of a color transformation. The nonuniform spacing is linearly related to the distance from a central point in a region of interest. The reduced size input and output tables allow creation of a reduced size composite table.

10 Claims, 9 Drawing Sheets

METHOD AND APPARATUS FOR COMPUTING COLOR TRANSFORMATION TABLES

BACKGROUND OF THE INVENTION

1. Field of the Invention

The present invention is directed to a system for creating transformation tables that are used to convert color values from one type of device, such as a scanner, to another type of device, such as a printer, and, more particularly, to a system in which the input and output table grid points increase in spacing from some area of importance, such as neutral, allowing tables to be reduced in size while maintaining transform accuracy in a region of interest.

2. Description of the Related Art

Color signals or values produced by or for one device, such as a color scanner, often need to be output to or represented by another device, such as a printer or display. Even though these devices may operate within the same color space such as RGB or u'v'L* the color values or signals produced by the first device need to be transformed into color values or signals suitable for the second device. To perform this transformation, several different sub-transformations are generally performed. Typical transformations that could be performed are illustrated in FIG. 1 when a system is providing color signals from a scanner to a display. This figure shows a transformation from a scanner 10 to a display 12 which includes input 14 and output 16 transforms and intermediate transforms 18 and 20 which make the image displayed on display 12 as close a visual match as possible to the input image scanned scanner 10 (See U.S. Pat No. 5,208,911). These transforms are typically multiterm equations represented in a computer 22 as a series of transform look-up and interpolation tables as depicted in FIG. 2 rather than as a series of formulas. This is because table look-ups and interpolations are much faster than formula computations for the computer formulas required in obtaining high quality color. Each transformation table includes a set of one-dimensional input tables 30, a three-dimensional grid table 32 and a set of one-dimensional output tables 34.

Because the grid tables 32 are used for interpolation, they need to be large in order to provide a desired level of accuracy in the final result. For pleasing transforms in particular, table sizes can become prohibitive. For example, consider a pleasing transform which modifies the color of flesh tones while leaving other colors unmodified. Such a transform has a high degree of curvature in color space yet must be tightly controlled. When such a function is represented as an interpolation table using a linear grid, the grid size must grow to 32×32×32 (or 32,768 points) to achieve the degree of accuracy required in typical graphic arts applications.

FIGS. 4 and 5 graphically illustrate the nature of the problem. Each figure shows a two-dimensional slice through color space. The particular space they show is the CIE u'v'L* space. The two-dimensional slice is perpendicular to the luminance axis, so that it indicates chrominance. The curved dotted line indicates the set of all physically realizable colors, while the grids 36 and 38 indicate the coverage given by a 16×16 point and a 32×32 point uniform grid. The distance between adjacent grid points in FIG. 4 is large enough to introduce unacceptable inaccuracies when representing pleasing transforms as interpolation tables.

What is needed is a system that reduces the size of the table yet maintains the accuracy desired by the color industry.

As noted above a transformation can be represented as a set of one-dimensional input look-up tables, a set of three-dimensional intermediate tables, and a set of one-dimensional output look-up tables. Because of interactions between the three types of tables, there is some ambiguity in how any given total transformation can be represented. In other words it is possible to modify the input tables, for instance, and compensate for the modification by making corresponding modifications to the output and/or intermediate tables. For any given transformation, as described in this application, this ambiguity can be exploited to produce a table representation which minimizes the size of the interpolation tables required to achieve a given level of accuracy. This minimization is often desirable for two reasons. First, it reduces the storage and memory required to use the table. Second, it reduces the amount of time required to compute the table. In situations where the table is being used to represent an interactive color move, this table computation time can be significant.

In practice, this optimization is often not performed. There are two reasons for this. The first is that there is no simple algorithmic procedure for optimizing the tables for a particular transformation. The second is that composing two transforms is more difficult when they have different input tables. For these reasons it is desirable to be able to use a standard set of input tables which work well for a broad class of transformations.

What is needed is a method for producing transform representations which do a good job of representing transformations whose output values depend strongly on the hue of the input and less strongly on other aspects of the input color. It is also desirable that the representations reduce the size of the grid tables.

Large color transform tables take a long time to compute and compose as well as access and also occupy a substantial region of random access memory space during real time transformations. As a result, what is needed is a table that is fast to compute and use and occupies less space than conventional tables.

SUMMARY OF THE INVENTION

It is an object of the present invention to provide a system that reduces the size of the grid table.

It is another object of the present invention to maintain color transform accuracy in regions of importance, such as near neutral.

The above objects can be attained by creating input and output tables that have a variable grid point spacing around a region or point of interest, such as neutral, such that the spacing is fine or provides high color resolution in the region of interest and sparse and of lower resolution in regions away from the region of interest. This spacing can be accomplished by providing a grid spacing that increases the farther the particular grid point is away from the region of interest.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
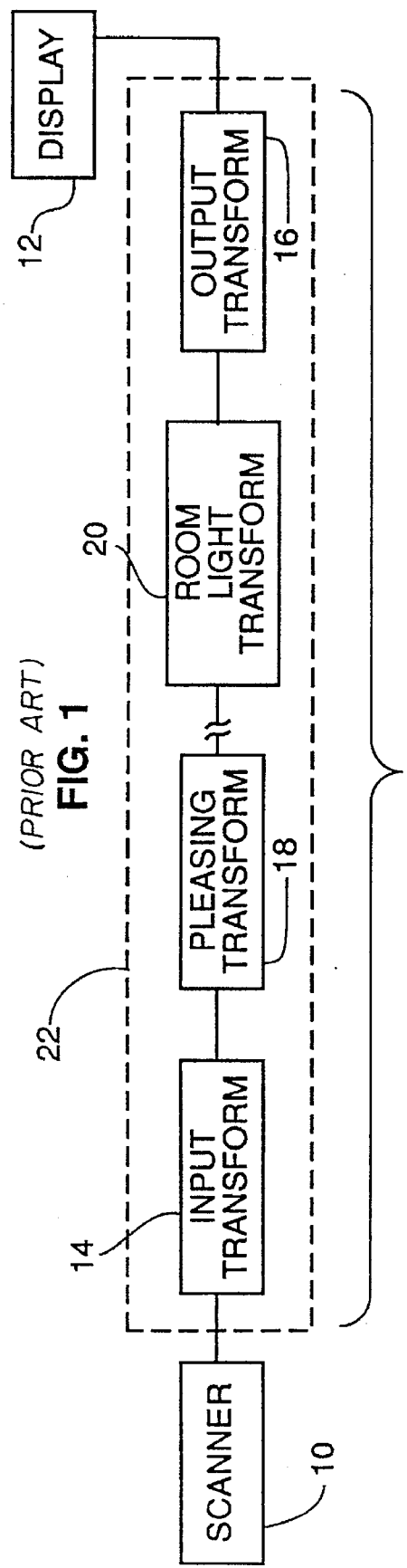
FIG. 1 depicts the transformations which occur when color signals for a scanner are converted into color signals for a display.
Figure 3:
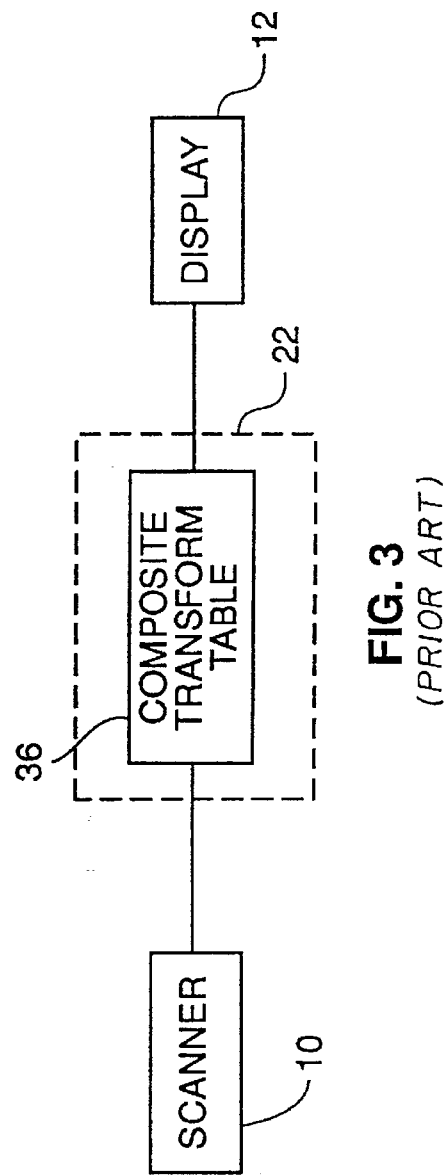
FIG. 3 depicts the composition or combining of the tables/transforms of FIGS. 1 and 2 into a single table/transform.
Figure 2:
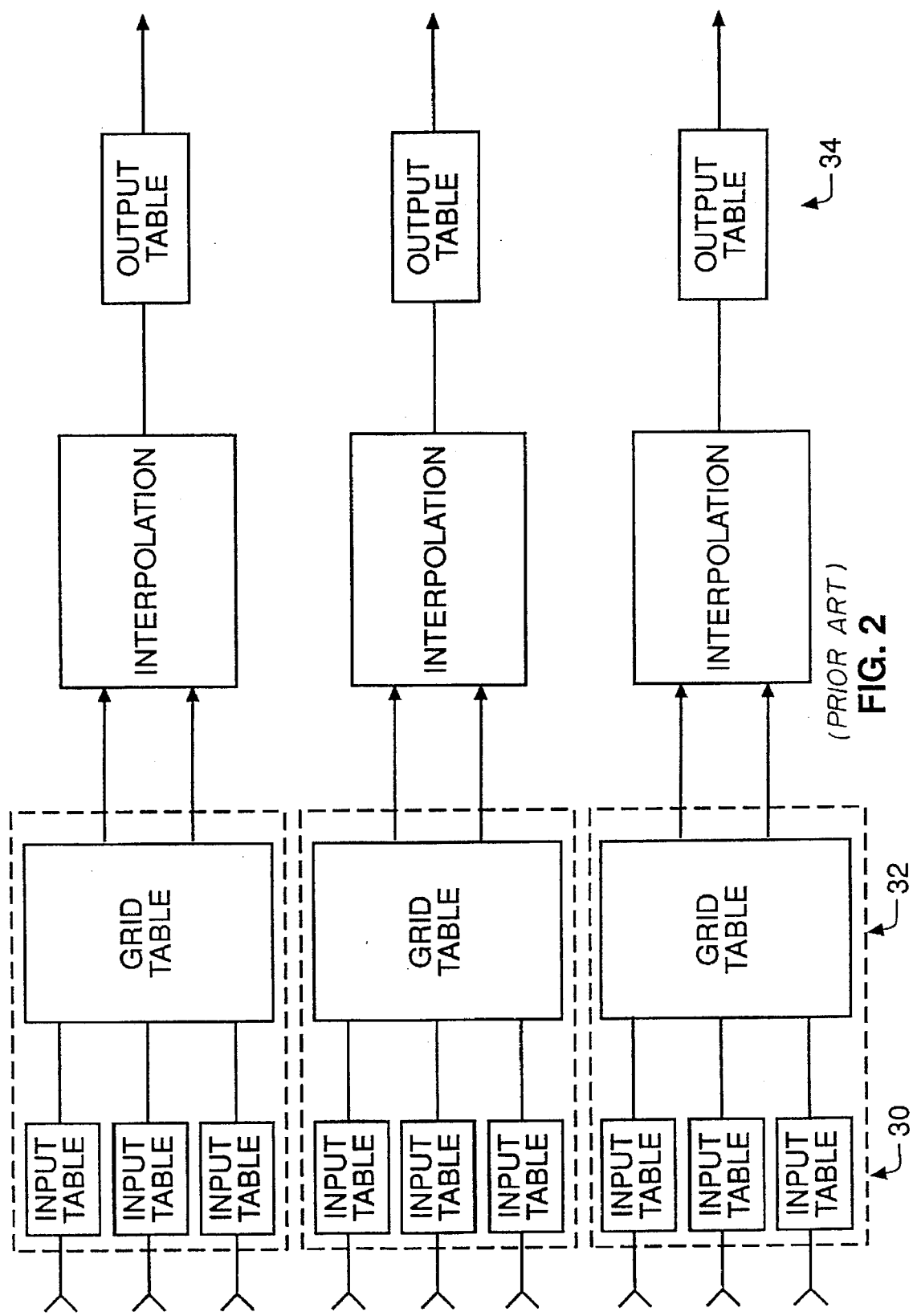
FIG. 2 depicts the tables used to accomplish the transformation of FIG. 1.
Figure 4:
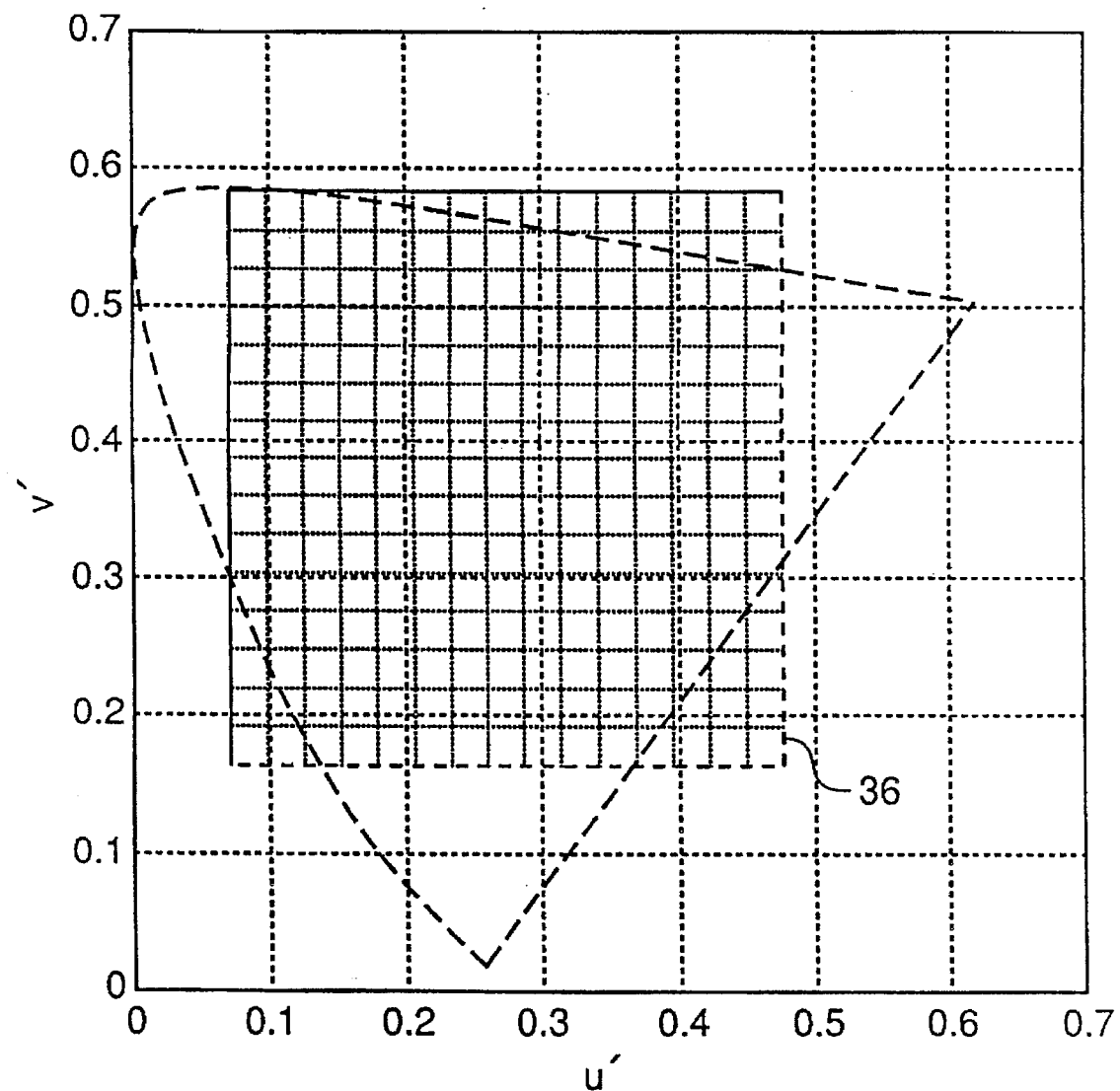
FIGS. 4 and 5 illustrate a uniform output transformation grids of different grid spacings or resolution.
Figure 5:
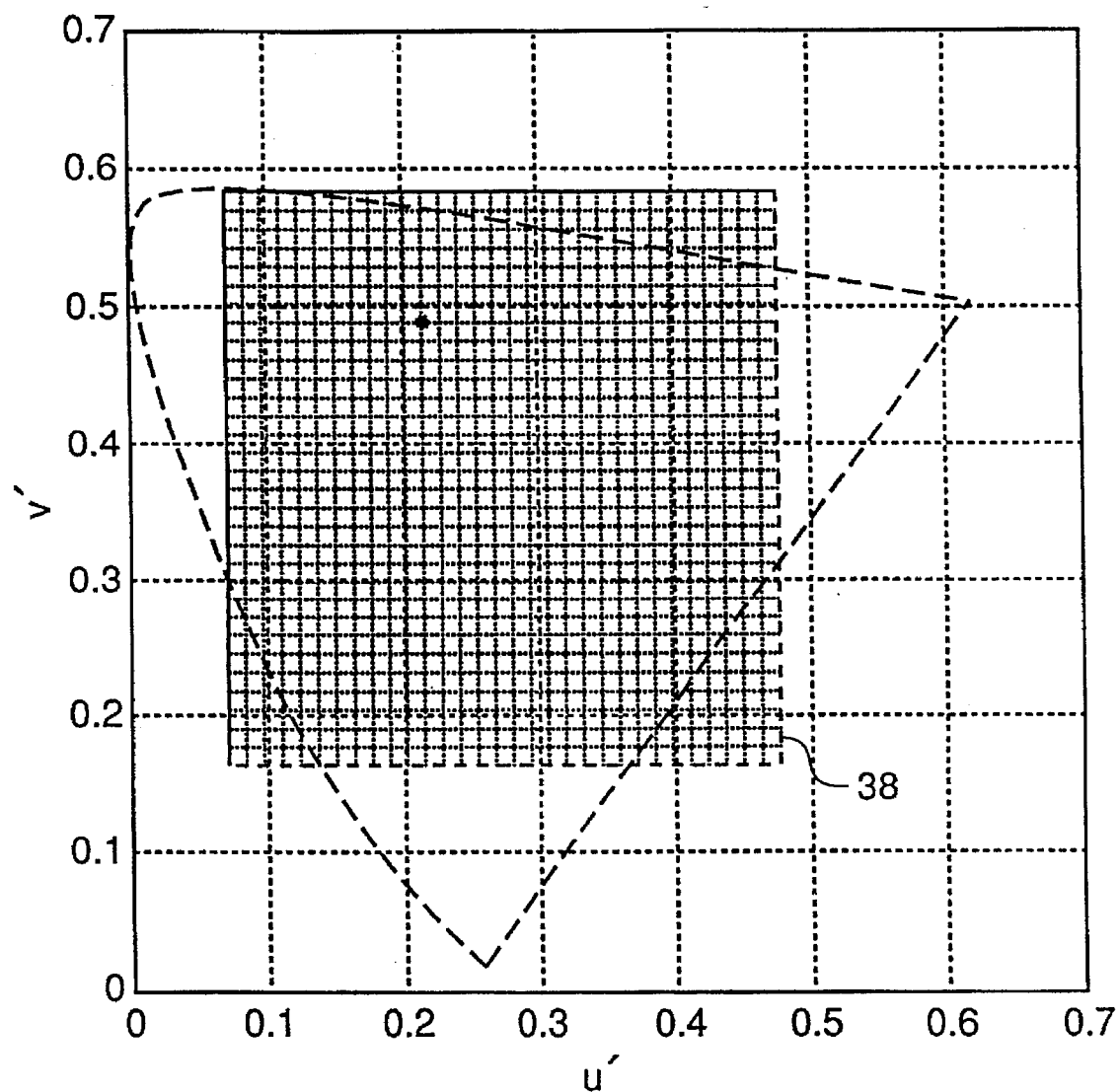
Figure 6:
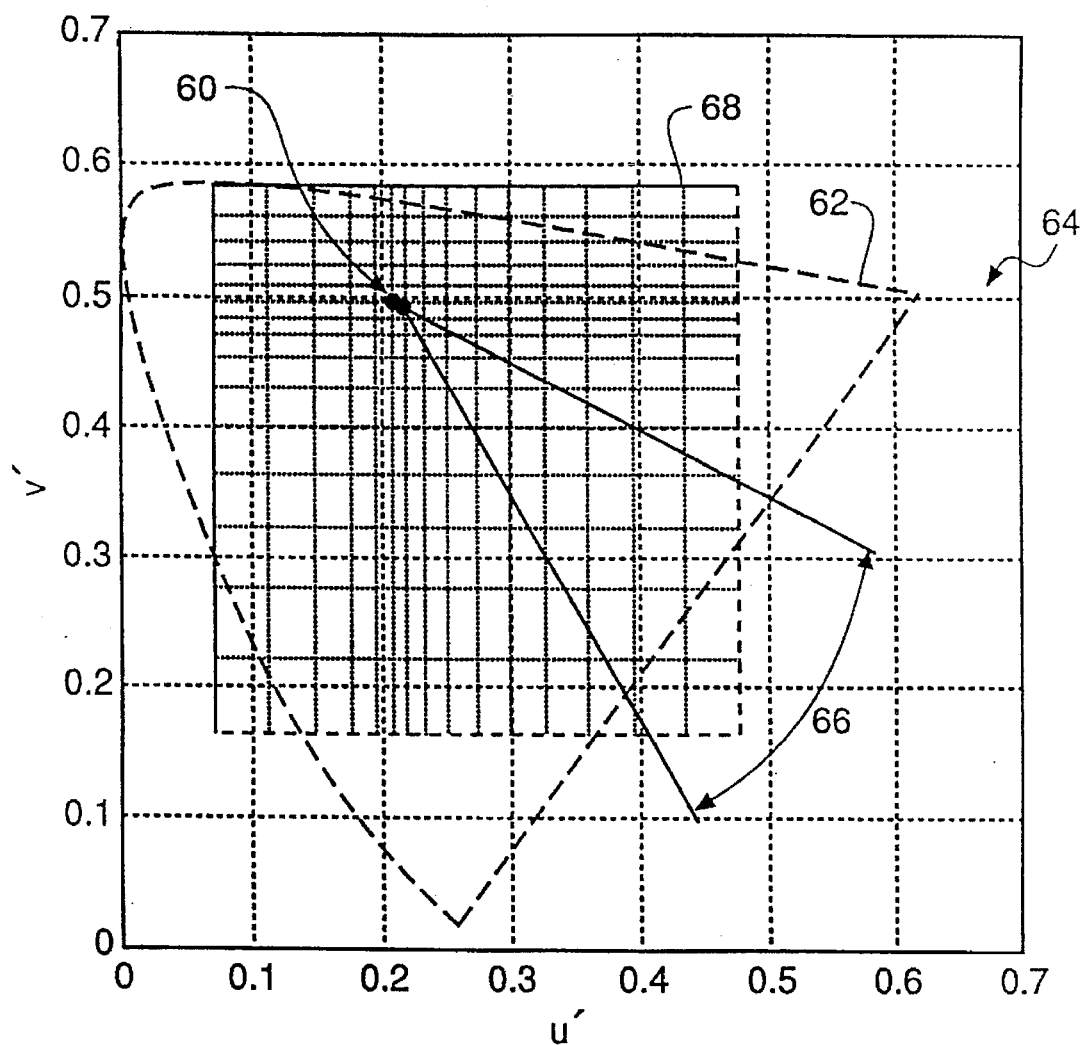
FIG. 6 depicts a non-uniform output grid in accordance with the present invention.

The present invention is particularly useful in color spaces in which neutral parallels a coordinate system axis. The present invention solves the problem of reducing the size of the grid table for spaces in which all of the chrominance information is restricted to two color channels while maintaining accuracy in a desired region by creating non-linear grid spacing around a central point of a region of interest. This is shown in FIG. 6 for u'v'L* space with the luminance axis coming out of the paper. In the present invention a point 60 (see FIG. 6) is selected in the color gamut 62 in the color space 64, and particularly, in the center of a region of interest in a chrominance space such as a u'v'. The point 60 shown in FIG. 6 is the point representing D50, an illuminant commonly used for specifying neutral. Using a neutral point improves saturation-dependant transformation computations. The interpolation grid 68 is arranged relative to this selected point 60, so that the grid spacing along each axis increases with distance from the point 60. In the example, the grid spacing increases roughly linearly with distance from point 60 along each chrominance axis. The grid 68 in FIG. 6 has also been arranged so that the number of grid points on each side of point 60 in the u' dimension is roughly proportional to the length of the u axis on each side of point 60, and so that the number of grid points above point 60 is roughly 40% of the total number of grid points. The reason for handling the u' and v' directions differently is that the v' coordinate for D50 is high enough so that handling v' like u' would result in too few points in the yellow region of the chrominance plane. This grid point spacing will result in the size of the table being reduced to 16×16×32 or 8,142 points. This will also result in substantially maintaining the desired accuracy in the region of interest around point 60. This can be seen by comparing the 32 point grid of FIG. 5 with the nonuniform grid of FIG. 6 around the neutral point (u'=0.209 and v'=0.488). As can be seen the number of grid points in the region of point 60 is approximately the same in both grid spacings. The fine spacing or high resolution of the grid points in the region of interest maintains the desired accuracy of color transformations in this region at the sacrifice of lower resolution transformations in the periphery of the grid. The growth of grid point separation linearly with distance from point 60 when the point 60 is D50 results in a wedge 66 of constant hue going through roughly an equal number of grid points of the grid 68 as the wedge expands as it moves further away from neutral. This results in greater control over hue transformation. As can be seen by visual inspection of FIGS. 4 and 5 this is not the case in a uniformly spaced grid. The nonuniform grid spacing around D50 is ⅓ the size of the spacing for a grid with the same number of uniformly spaced points. Thus, the accuracy is three times greater in the region of interest for a nonuniform grid than a uniform grid.

Figure 7:
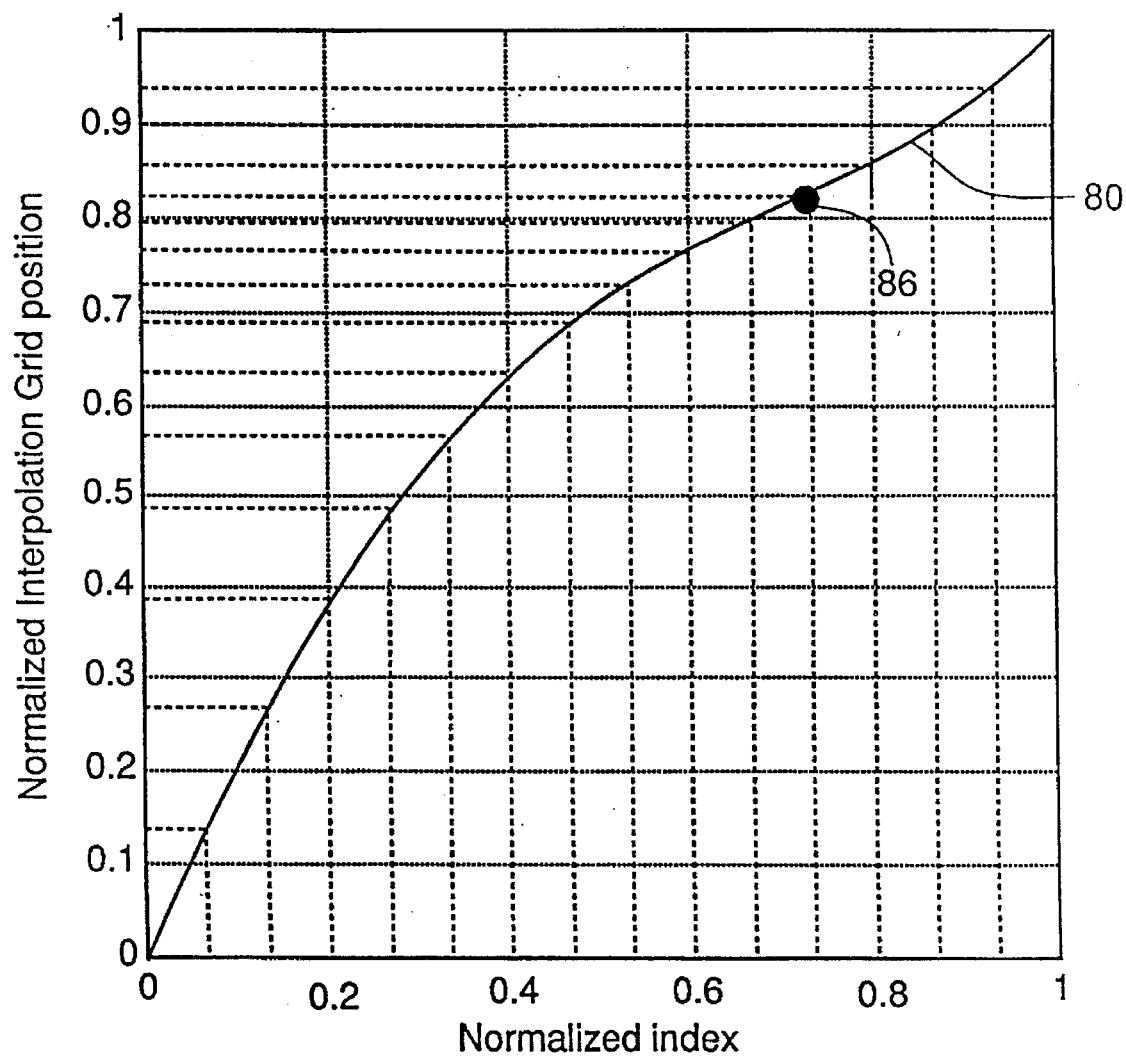
FIGS. 7 and 8 illustrate transfer curves with non-uniform point spacing in accordance with the present invention.
Figure 8:
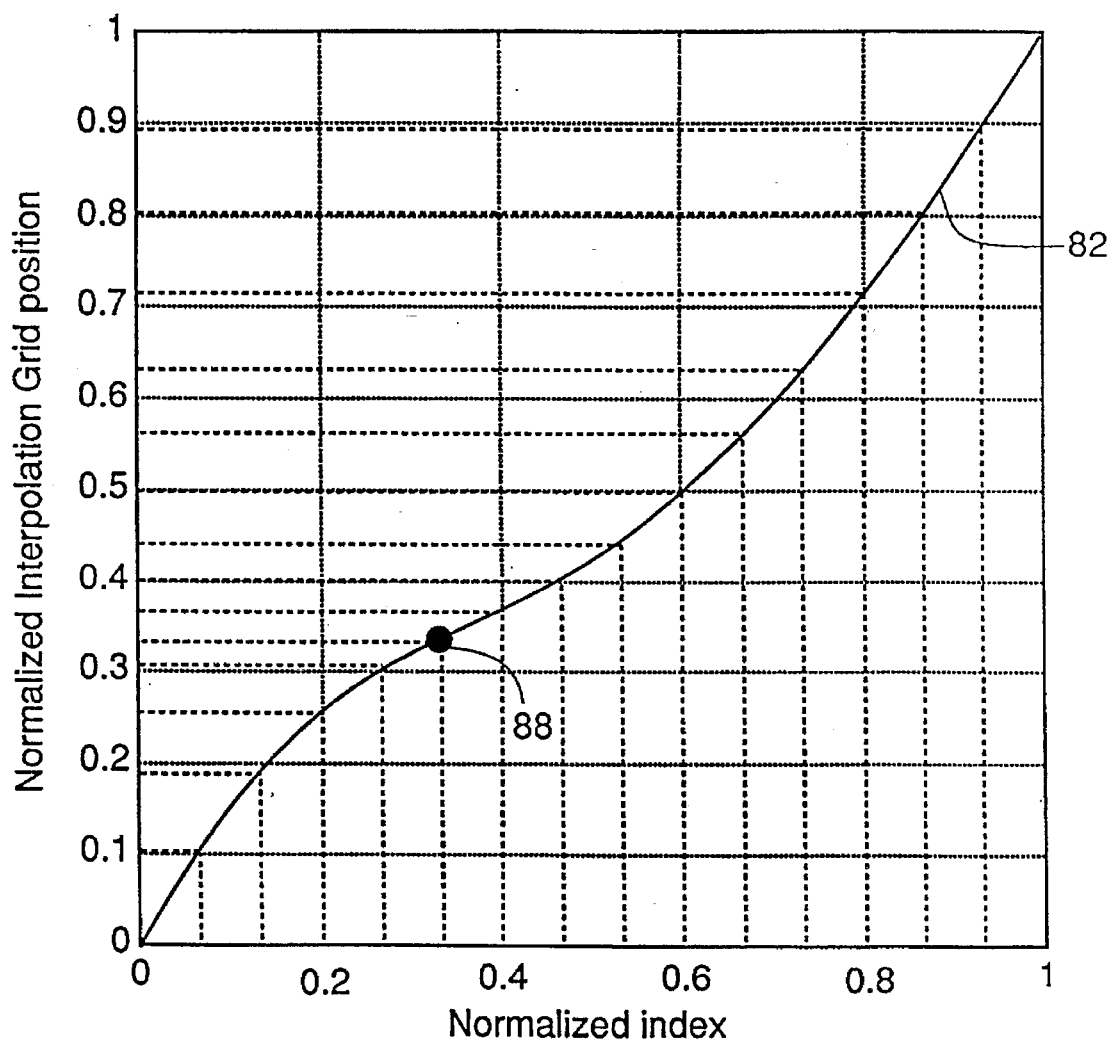

To create the look-up table for the non-uniform output grid 68 of FIG. 6, the present invention starts with the one dimensional quadratic grid point transform curves or functions for the output transform for the u' and v' chromaticity coordinates. Since the grid point transform curves or functions of the u' and v' curves usually do not match in range, for example, the v' coordinates in FIG. 6 range from about 0.17 to about 0.58 while the u' coordinates range from about 0.07 to about 0.48, the curves need to be normalized to those ranges. The normalized grid point transform curve 80 for v' is shown in FIG. 7 and the normalized transform curve 82 for u' is shown in FIG. 8. For FIG. 8, 0 corresponds to u'=0.07 and 1 corresponds to u'=0.48. These output transfer curves map 16 uniformly spaced normalized values to 16 non-uniformly spaced normalized values using quadratic curves. To create the two dimensional table of FIG. 6 the point in the center of the region of interest is determined. In the example previously described the neutral point D50 is the center of the region of interest. The neutral point 86 for v' corresponds to 0.77 in FIG. 7 and the neutral point 88 for u' corresponds to 0.34. Once the center of the region of interest is known the number of grid points to be allowed is used to determine the spacing to create the nonuniform grid point spacing. The method of producing the non-uniformity can use any function that creates a spacing that increases as the distance from the point of interest increases. The preference is to use a function whose slope increases roughly linearly with distance from the point of interest. FIGS. 6–8, illustrate grid points for an output table. The input tables are created by inverting the output transform curves.

When the number of grid points, for example 16, are known a linearly increasing spacing, with distance from neutral, of the points on either side of the point of interest in each dimension with respect to a uniformly spaced grid, such as is shown in FIGS. 7 and 8, can be determined by:

```
For grid value 0 to (grid points −1)
    dw=grid value − neutral point
    if (dw >=0)
        remapped value = neutral point value + dw *
        (slope + dw * Aplus)
    else
        remapped value = neutral point value + dw *
        (slope − dw * Aminus)
``` where grid value is the value of the grid point in the uniformly spaced grid with values of 0, 1/16, 2/16 . . . in this example, grid points is 16 in the example being discussed, dw is the distance from the neutral point, the neutral point is the center of the region of interest, remapped is the remapped grid point value, slope is the slope at the point of interest, D50 or neutral in this example and which slope is ⅓ in this example, and Aplus and Aminus are normalization offset parameters that ensure that 0 maps to 0 and 1 maps to 1. The above procedure is performed for both the u' and v' axes and produces new grid values from the grid values of a uniform or standard grid having the desired accuracy. As noted above, FIGS. 7 and 8 illustrate the results of the procedure.

Figure 9:
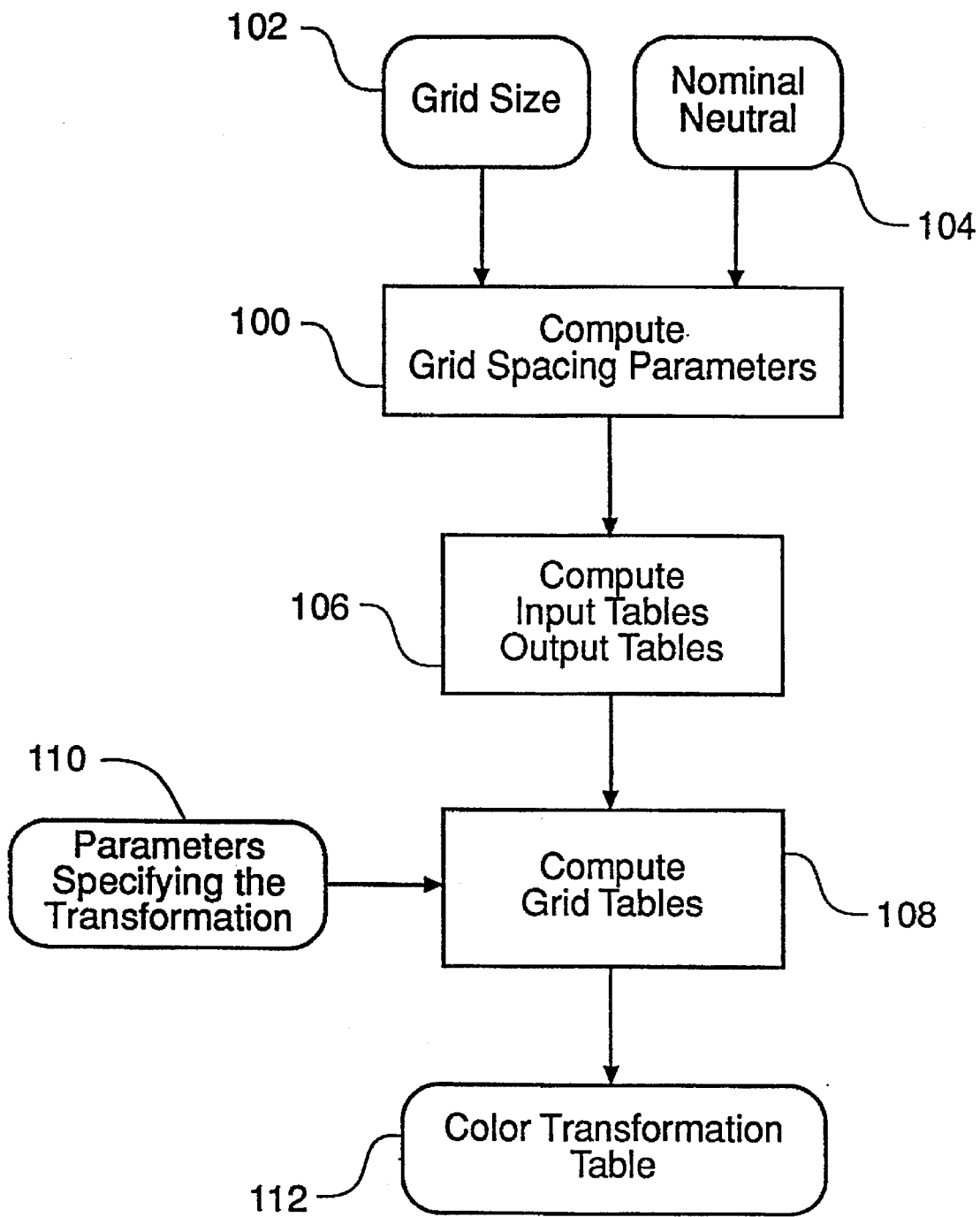
FIG. 9 depicts the operations of the present invention.

The above-described step of computing or remapping the grid spacing from uniform to non-uniform from the input grid size 102 and the point of interest 104 is depicted in the flowchart of FIG. 9. Once the desired grid size 102 and neutral value 104 have been specified, they are used to compute 100 the grid remapping function for each table dimension, as described previously. The input and output tables are then computed 106. Each output table is made proportional to the corresponding grid remapping function. The constant of proportionality depends on how the tables are encoded. In the preferred implementation, the inputs and outputs of each transformation are 8 bit numbers, while each grid table is a 12 bit number. Thus, the output tables map the range 0–4095 to the range 0–255. In this case the output table is determined by:

output_table(i)=255*normalized_grid_
remapping_function(i/4095)

Once the output tables have been computed, each input table is computed by inverting the corresponding output table. One way of producing this inversion is to use a low order interpolation on the output table. Once the input and output tables have been computed, and once the desired color transformation has been specified 110, the grid table can be computed 108 using the following procedure. For each grid point: 1) use the output tables to compute the physical value corresponding to that grid point; 2) apply the desired transformation to that physical value; 3) use the input tables to compute the grid value corresponding to that result; and 4) use the result of (3) to populate the grid table at that point. Once these intermediate transform tables are known the system combines or composes the input, output and intermediate tables into the final color transformation table 112 (for example, table 36). The steps of producing the intermediate tables and composing all the tables into a single table are also conventional.

Figure 10:
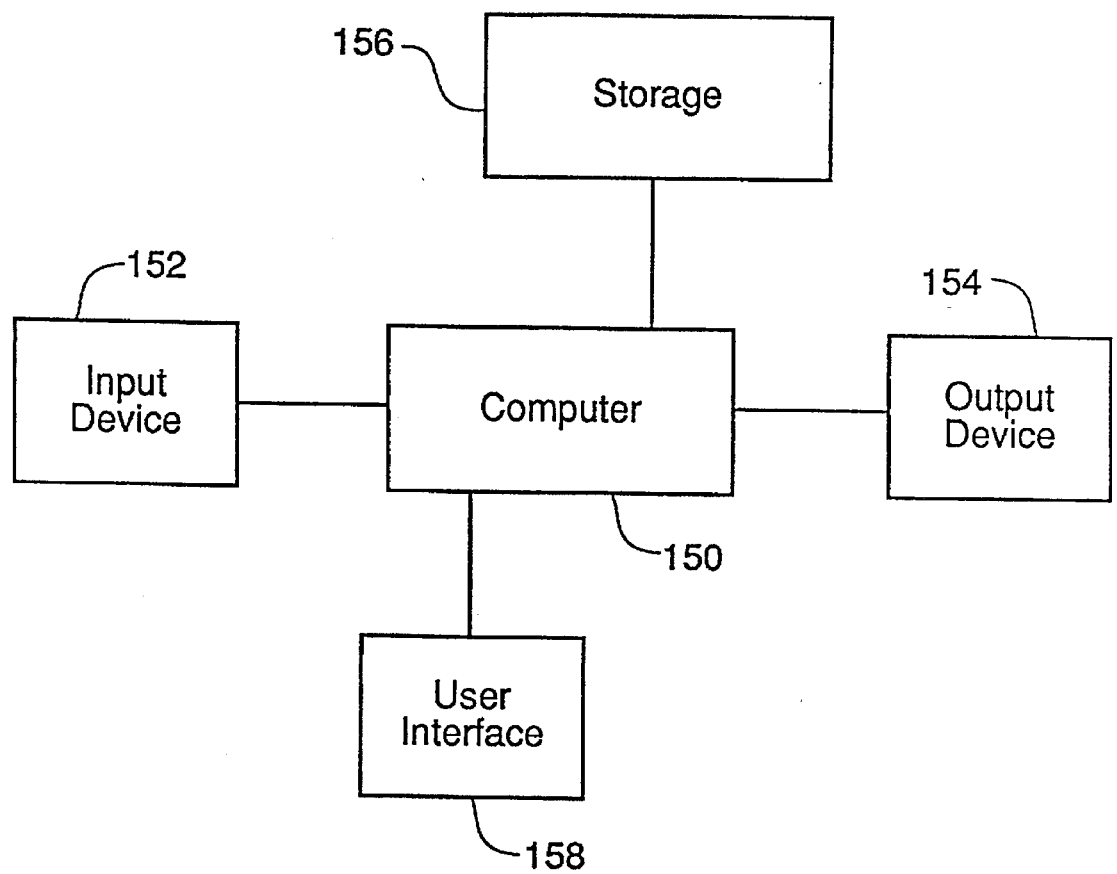
FIG. 10 illustrates typical hardware used in the present invention.

The present invention typically operates in an environment, as illustrated in FIG. 10, which includes a computer 150, such as an Apple Macintosh II, coupled to receive an input transform for an input device 152, such as a scanner, and an output transform for an output device 154, such as a display or printer. The computer system includes a storage device 156, such as a hard disk drive, which stores the tables and transforms used to create the composite table. A user interface 158, such as a keyboard with a display, can be used to specify the intermediate transforms and the desired grid size.

Other non-uniform spacings of grid points can also be created. For example, two regions of interest in a color space can be defined and the number of grid points in each region can be increased over a uniform spacing with the areas between the regions receiving a sparser number of points.

The invention has also been described with a constant slope characteristic being used to determine spacing. It is possible for the slope to vary with distance in a complex function.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating a color transformation table, comprising:

designating nonuniform index point spacing for the table around a neutral point so that a portion of a color space where the human eye is sensitive is emphasized; and determining entries in the table using a transformation function responsive to the index points.

2. A method of creating a color transformation table, comprising:

determining index points with a nonuniform index point spacing for input and output tables having a rectilinear coordinate system with the index points most densely clustered at a neutral point so that a portion of a color space where the human eye is sensitive is emphasized;

determining entries in the input and output tables using a transformation function responsive to the index points;

producing an intermediate transform table using an intermediate transform function responsive to the entries; and combining the input, intermediate and output tables into a single color transformation table.

3. A method as recited in claim 2, wherein the spacing between index points increases linearly with distance from a predetermined point.

4. A method as recited in claim 3, wherein the predetermined point comprises neutral.

5. A method as recited in claim 2, wherein the spacing between index points increases quadratically with a distance from a neutral point.

6. A method of creating a color transformation table, comprising:

designating a neutral point as a center point of a region of interest in a luminance color space so that portions of a color space where the human eye is sensitive are emphasized;

designating index points in the color space with a nonuniform spacing relation to the center point; and determining entries in the table using a transformation function responsive to the index points.

7. A method of creating a color transformation table, comprising:

inputting a table grid spacing having index values with uniform spacing;

determining new index values having a nonuniform spacing clustered at a neutral point so that portions of a color space where the human eye is sensitive are emphasized; and determining entries in the table using a transformation function responsive to the index values.

8. A method of creating a color transformation table, comprising:

determining index points with a nonuniform index point spacing for input and output tables having a rectilinear coordinate system with the index points most densely clustered in a region of interest;

determining entries in the input and output tables using a transformation function responsive to the index points;

producing an intermediate transform table using an intermediate transform function responsive to the entries;

combining the input, intermediate and output tables into a single color transformation table;

wherein the spacing between index points increases linearly with distance from a predetermined point.

9. A method as recited in claim 8, wherein the predetermined point comprises neutral.

10. A method of creating a color transformation table, comprising:

determining index points with a nomuniform index point spacing for input and output tables having a rectilinear coordinate system with the index points most densely clustered in a region of interest;

determining entries in the input and output tables using a transformation function responsive to the index points;

producing an intermediate transform table using an intermediate transform function responsive to the entries;

combining the input, intermediate and output tables into a single color transformation table; and wherein the spacing between index points increases quadratically with a distance from a neutral point.

\* \* \* \* \*